Sept. 21, 1965    A. A. ZUEHLKE ETAL    3,206,984
ACCELERATION-SENSITIVE INSTRUMENT
Filed April 24, 1961    2 Sheets-Sheet 1

INVENTORS.
ARTHUR A. ZUEHLKE
GEORGE J. BROWN
BY

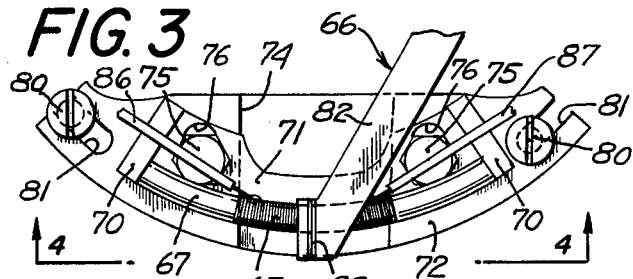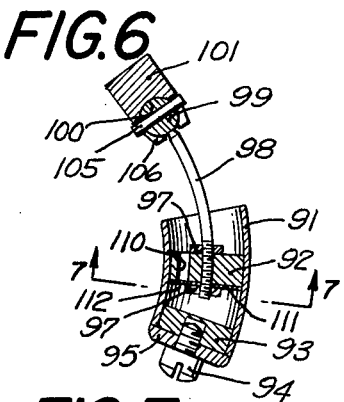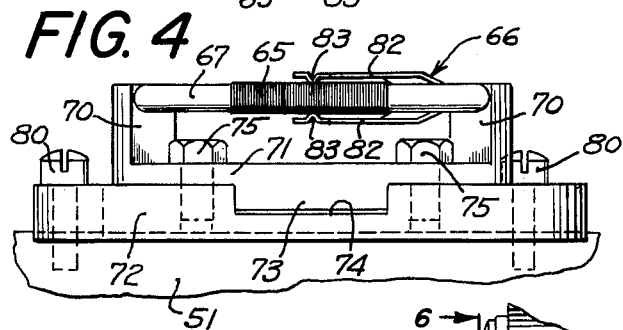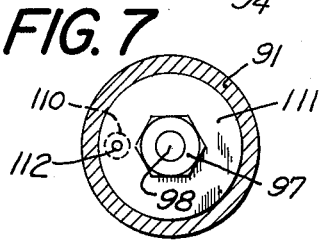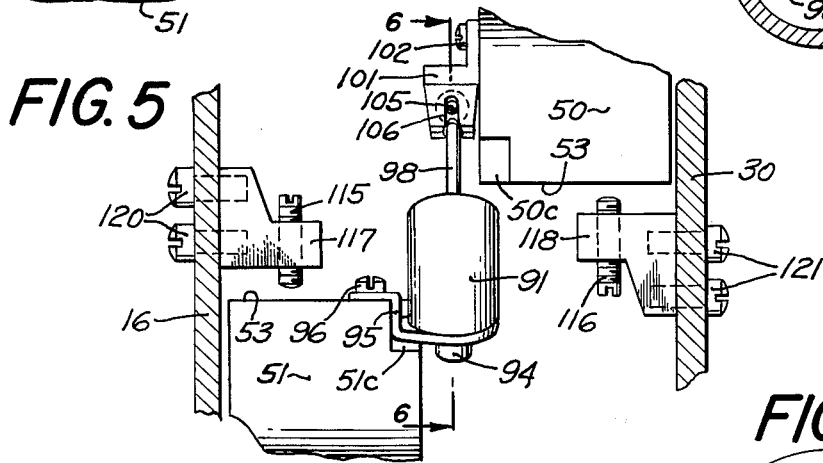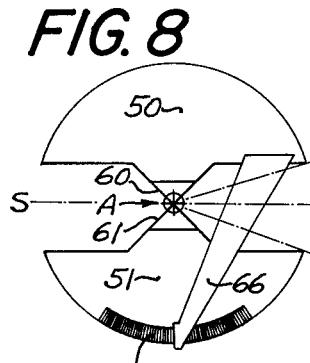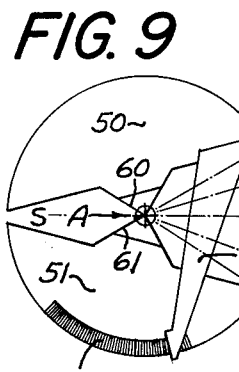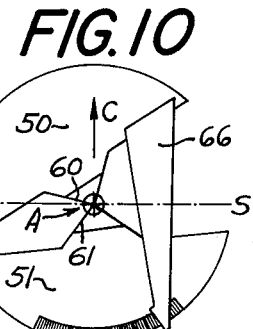
INVENTORS.
ARTHUR A. ZUEHLKE
GEORGE J. BROWN & # United States Patent Office 3,206,984
Patented Sept. 21, 1965

3,206,984
ACCELERATION-SENSITIVE INSTRUMENT
Arthur A. Zuehlke and George J. Brown, Riverside, Calif., assignors to Bourns, Inc.
Filed Apr. 24, 1961, Ser. No. 105,051
2 Claims. (Cl. 73—497)

This invention pertains to acceleration-sensing devices, and more particularly to instruments useful for producing an indication, such as a variation of electrical resistance for creating or controlling a signal, e.g., an electric current, to provide an output signal that is a function of linear acceleration of a device.

Prior-art acceleration-sensing devices are of various types each of which types is directed to a respective class of uses. One type, directed to uses under severe environmental conditions such as are presented by guided rocket-propelled missiles and the like, utilizes a rigid mass suspended in a housing for movement relative to the housing or other relatively fixed means in the housing; the relative movement between the two components being utilized to provide a change such as a change in electrical resistance effective in an electrical circuit, for indicating the magnitude of the acceleration to which the device is subjected. The rigid mass is restrained by spring means whereby the mass is returned to a rest or neutral attitude upon disappearance or decay of the accelerating force or forces, and is usually of a material having a large value of density. As may be evident, it is desirable in instruments of the class to which the present invention is directed, for the instrument to be small, durable, compact, simple, possessed of good resolution, insensitive to accelerations transverse to the axis of sensitivity (sensitive axis) of the instrument, relatively unaffected by changes in temperature of the ambient, possessed of high sensitivity, and linear in operation. While some prior art instruments attained excellence in one or another of the stated desirable characteristics, none has attained that rating in all respects. The present invention provides a device attaining excellent rating in each of the noted characteristics. The instrument or device meets the stated desirable features and is small and compact, due in part to the special configuration of the inertial masses and the unique suspension thereof, coupled with the nature of the movement-indicating components, and in part because of a specific motion-damping device used in conjunction with the masses. The damping is made to be dependent upon inertia of a damping fluid and independent of the viscosity thereof, whereby change in temperature of the fluid is of no consequence.

Accordingly it is a primary object of the invention to provide an acceleration-sensing device or acceleration sensor of the class described, having extremely high accuracy and excellent resolution over the entire range of operation of the instrument.

One important object of the invention is to provide an acceleration sensor of the type utilizing spring-supported masses in a system which is virtually free of friction effects. This object is accomplished by components disposed in a unique arrangement wherein the masses are supported by or upon crossed leaf-springs. The springs are of material little affected by temperature changes and are constructed and arranged to provide substantially frictionless supports for the mass members and are so disposed that the masses undergo pivotal movements about a common or respective axes of rotation. Among the advantageous features of the described arrangement are very low threshold sensitivity and, at the same time, high overload capacity. The result is an acceleration sensor characterized by outstanding performance and having an exceptionally narrow static temperature error band. Static temperature error band may be defined as the maximum deviation of the output signal from a straight line drawn through the coordinates of 0% range, 0% output, and 100% range, 100% output, including the effects of non-linearity of signal elements, friction, hysteresis, resolution, and repeatability, as measured over the limits of the temperature range within which the instrument is expected to be used.

Another object of the present invention is to provide a linear acceleration sensor of the spring/mass type, having a high natural frequency without sacrificing sensitivity of response or resolution in auxiliary means used for producing an electrical signal. The nature of the spring-supported mass system is such that its natural frequency is inversely proportional to the square root of the distance traveled by the mass. However, reducing the travel of the mass to increase natural frequency has an adverse effect on resolution and sensitivity. In the described embodiment of a system according to the present invention, the mass is distributed substantially equally between two bodies which are independently supported for swinging movement about substantially a common axis in opposite directions of rotation, and electrical signal means are connected to the two mass members so as to provide an indication or output signal that is a function of the total angular displacement of the two bodies from neutral positions. Thus, the natural frequency for the accelerometer is the same as that which would ordinarily be obtained with a mass member of only $1/\sqrt{2}$ or 0.7 of the mass of the total used in the system, whereas the sensitivity and resolution are twice that which would be obtained with a single spring/mass system conventionally used. The natural frequency of the spring/mass system in the illustrated embodiment of the invention is $\sqrt{2}$ or 1.41 times the frequency of the same total spring/mass system when suspended in the conventional manner; and this increased natural frequency is responsible for the essentially flat output signal of the instrument to relatively high frequency accelerations.

Another important object of the invention is to provide a linear acceleration sensor which is virtually insensitive to acceleration in a plane transverse to the axis of sensitivity of the instrument.

Another object of the invention is to provide an instrument in which friction effects are minimized.

Another object of the invention is to provide an instrument of the class described having relatively constant damping characteristics over a very wide range of ambient or environmental temperatures. This object is achieved by the use of a unique damping system utilizing a fluid and a principle in accordance with which the damping is due almost entirely to resistance of the fluid to acceleration, and is relatively independent of the viscosity of the damping fluid. In accord with the invention the viscosity of the damping fluid may change by some 9:1 ratio, over the temperature range to which the instrument is exposed, yet the damping characteristics remain almost constant.

These and other objects and advantages of the invention will become apparent to those skilled in the art upon consideration of the appended claims and the following description of a preferred embodiment thereof, reference being had to the accompanying drawings, wherein:

FIGURE 3 is a detail view, to a larger scale, of electrical means, taken as indicated by line 3—3 in FIGURE 1;

FIGURE 4 is a view of the means shown in detail in FIGURE 3, in the direction indicated by line 4—4 in FIGURE 3;

FIGURE 5 is a fragmentary elevational view of the damping mechanism, taken as indicated by line 5—5 in FIGURE 2;

FIGURE 6 is a sectional view taken as indicated by line 6—6 in FIGURE 5;

FIGURE 7 is a sectional view taken as indicated by line 7—7 in FIGURE 6, but on a larger scale; and FIGURES 8, 9 and 10 are schematic diagrams useful in explaining operation of a device according to the invention.

Figure 1:
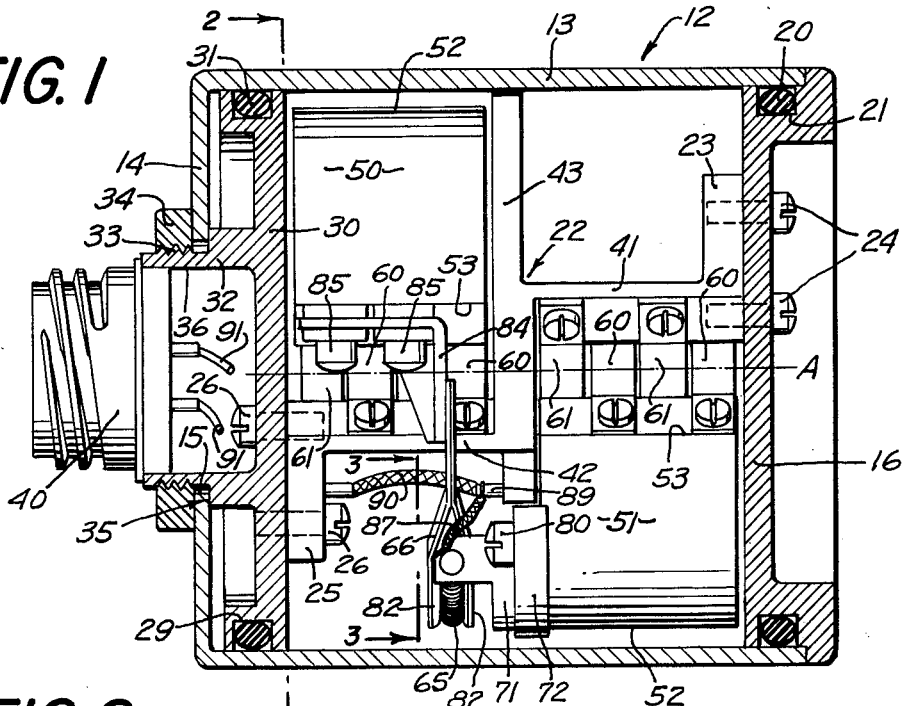
FIGURE 1 is a view partly in section of an acceleration-sensitive instrument embodying the principles of the present invention, the view being taken as indicated by line 1—1 in FIGURE 2.

In the drawings, the exemplary acceleration-sensitive instrument according to the invention is designated in its entirety by the reference numeral 12, and comprises a generally cylindrical, cup-shaped housing member 13, having an inwardly extending flange 14 at one end, which flange is formed to provide a centrally disposed aperture 15. Closing the housing at the other end of member 13 is a base plate 16 having laterally projecting mounting ears or flanges 18 (FIG. 2), each of which ears has a respective screw hole 19, whereby the instrument may be suitably mounted. The base plate 16 has a round portion extending into the housing member 13, and is provided with a circumferential groove 21 for reception of sealing means in the form of an O-ring 20.

Disposed within the housing member 13 is a specially shaped support member 22 (FIG. 1) having at its base end a flange 23 which is secured to the base plate 16 by screws 24. At the opposite end of the support member 22 is a second flange 25 which is secured by screws 26 to a circular upper plate 30 which closely fits the interior wall of housing member 13. The plate 30 is provided at its outer periphery with a circumferential groove 29 for reception of an O-ring 31. The O-rings 20 and 31 serve to seal the interior of the housing 13 between plates 16 and 30 against ingress or egress of foreign matter. Screws 24 and 26 may be sealed in any suitable way, such as by being dipped in or covered by a self-curing resin or the like, in known manner.

Extending outwardly from the upper plate 30 through the aperture 15 in the flange 14 is a boss 32 having external threads 33 for reception of a locking nut 34. The locking nut 34 is turned tightly against the outer face of the flange 14 of the housing member, clamping the flange against a shoulder 35 on the boss 32. The boss 32 provides a cavity 36, and pressed into this cavity and secured therein, by solder for example, is a threaded electrical fitting or connector 40, which is adapted to receive a companion fitting (not shown) for electrically connecting the instrument to electrical circuit means (not shown).

Figure 2:
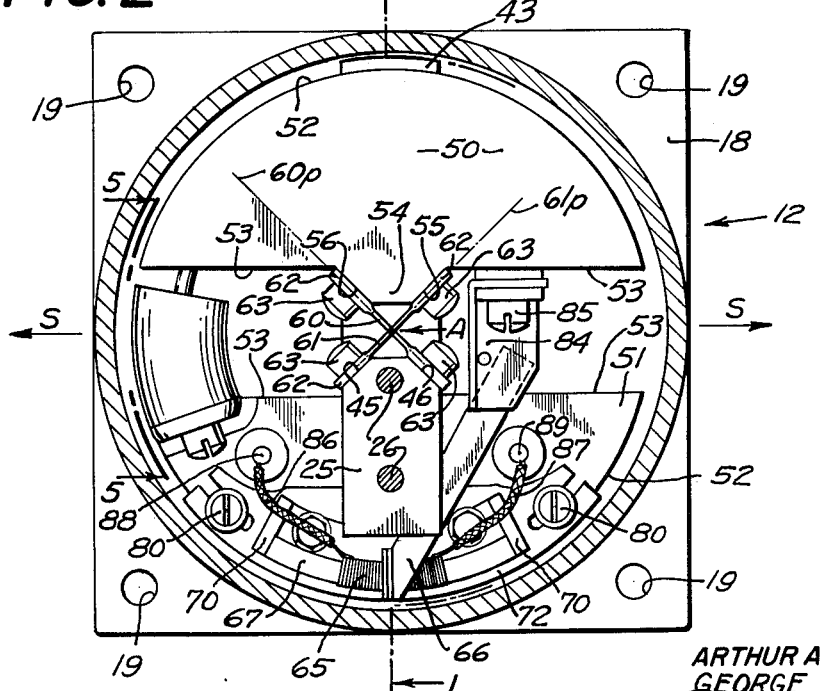
FIGURE 2 is a transverse sectional view of the instrument, taken as indicated by line 2—2 in FIGURE 1.

As best shown in FIGURE 1, the support member 22 includes, midway between lower and upper flanges 23 and 24, a center wing or flange 43 which as shown is formed integral with the other flanges and is connected thereto by two offset risers 41 and 42, respectively. The risers are used as supports, and are oppositely offset from the longitudinal axis of the cylindrical housing member 13. As indicated in FIG. 2, the upper riser 42 has vertical perpendicularly related mounting surfaces 45 and 46 that are in respective planes parallel to the longitudinal axis of the housing member 13, and upon which surfaces are mounted means presently to be described. The lower riser 41 is formed with a similar pair of perpendicularly related mounting surfaces that are likewise in respective planes parallel to the longitudinal axis of housing member 13.

Disposed within the housing on opposite sides of the longitudinal axis thereof and preferably equidistant therefrom are upper and lower mass members 50 and 51, respectively, preferably of similar shape, size and mass. The two mass members 50, 51 are disposed on respective opposite (upper and lower) sides of the center flange 43 of the support member, so that mass member 50 is associated with upper riser 42, while mass member 51 is associated with lower riser 41. Each of the mass members has a curved outer surface 52 disposed more or less concentric with the inner surface of the housing member 13, and each mass is formed with a pair of substantially coplanar flat inner surfaces 53. Projecting from the flat inner surfaces 53 of either of the mass members and extending parallel to the longitudinal axis of the housing 13 is a respective projection 54 shaped to provide two preferably perpendicularly related surfaces such as 55 and 56 on member 50, as indicated in FIG. 2. The surfaces 55, 56 are likewise disposed in respective planes parallel to the axis of the housing.

Each of the mass members 50 and 51 is suspended from its respective riser, 42 or 41, by respective sets of crossed leaf springs 60 and 61; there being at least one pair of such crossed leaf springs, and preferably two pairs of springs, per mass member as shown in FIGURE 1. The leaf springs form substantially the entire means of support of the mass members. Each of the leaf springs 60, 61 is in the form of an elongate, thin, flat strip of resilient material, preferably of a material the modulus of elasticity of which is little affected by temperature changes. An exemplary preferred material is that marketed under the trade name "Ni-Span C," marketed by International Nickel Co., Inc. Preferably the end or terminal portions 60 of the springs are thicker than the middle portions. Opposed ends of the springs are secured by screws 63 to the faces 45, 46 on the risers 41, 42, and to the faces 55, 56 of the projections 54 on the mass members, respectively. The planes in which the mounting surfaces 55 and 56 of projection 54 lie are respectively parallel to the planes in which the riser surfaces 45 and 46 are disposed, and are respectively separated from the latter a distance substantially equal to the thickness of an end of one of the leaf springs 60, 61, as is made evident in FIG. 2. With reference to mass member 50 and the associated springs 60 and 61, the central planes of springs 60 (that is, the planes in which the springs 60 are substantially disposed) are coplanar, and the plane is indicated at 60p in FIG. 2. Similarly, the springs 61 are substantially disposed in coplanar relationship in a plane indicated at 61p. Similar statements are true with respect to mass member 51 and the springs 60 and 61 supporting that mass member. Considering the mounting or suspension of mass member 50, the planes 60p and 61p intersect along a line of intersections that defines an axis about which that mass member rotates; and the construction and arrangement of mass member 50, support riser 42, and sets of springs 60 and 61 is preferably such that the defined axis is substantially coincident with the longitudinal axis of the housing member 13. Also, the line of intersection of the planes of the springs 60, 61 associated with mass member 51 defines an axis of movement of the latter mass member. Preferably, but not necessarily, the structural arrangement of the components is also such that the axis of movement of mass member 50 is coincident or colinear with that of mass member 51. That is, the arrangement is preferably such that all of springs 60 are substantially disposed in a single plane, and similarly in the case of all of springs 61. The arrangement is so depicted in FIGS. 1 and 2, in which the line of intersection of the mentioned planes, and hence the axis of rotation of the mass members, is indicated by the ordinal A. Also, preferably, but not necessarily, the arrangement of the components is such that plane 60p is substantially perpendicular to plane 61p.

The crossed leaf springs 60, 61 are adapted to flex under the inertial forces exerted by the mass members 50, 51 in response to acceleration of the instrument along its sensitive axis. The sensitive axis is represented in FIGURE 2 as the broken horizontal line S—S, perpendicular to axis A. That flexure of the leaf springs 60, 61 results from a virtually frictionless pivoting or rotational movement of the mass members about axis A. Thus the springs provide, in effect, nearly frictionless balanced pivotal supports for the mass members while at the same time exerting balanced couples tending to return the mass members to neutral positions following displacements in either direction from neutral attitudes. The arrangement of the springs, and the type used, offers extreme stiffness in the direction of axis A; with attendant advantages in reduction of effects of accelerations in the direction of the axis. Viewed as in FIGURE 2, acceleration of the instrument toward the right results in counterclockwise swinging movement of the upper mass member 50, and clockwise swinging movement of the lower mass member 51. The mass members 50, 51 are preferably substantially equal in mass, and therefore pivot through substantially equal arcs in opposite directions in response to acceleration of the support along the sensitive axis. However, since they swing in opposite directions, the angular displacement between the two members 50, 51 is equal to the sum of their respective angular travels. That valuable feature of the instrument is illustrated in FIGS. 8 and 9. In FIG. 8 the angular separation of adjacent edges of members 50, 51 from a vertical plane through axes A and S—S is in each case denoted by Ω when the instrument is static. As indicated in FIG. 9, an acceleration of the instrument toward the right along the sensitive axis causes displacement of rotation of member 50 counterclockwise through an angle Δ, and a similar rotation of member 51 clockwise. From the diagram it is evident that the total relative displacement between the two mass members is equal to twice the displacement, Δ, of each of the members. Advantage of that feature is taken to provide an instrument of substantially doubled sensitivity compared to prior art acceleration-sensitive instruments of the same inertial mass, and to grossly reduce the extent of bending a single spring would otherwise undergo in an equivalent single-mass instrument. Thus the stress and hysteresis in the springs are kept at low maximum values. Also, it is evident that the crossed-springs supports for the masses provide not only relatively frictionless pivotal mounting but also provide the desirable feature of elimination of extraneous spring means for returning the masses to neutral attitudes upon cessation of acceleration along the sensitive axis of the instrument. Since the natural frequency of a spring-supported mass is expressed by:

$$fn = K_1(G/D)^{1/2} \qquad (I)$$

wherein $fn$=natural frequency of the system, $K_1$ is a dimensional constant, G is the total "g" range of the system, that is, the range of operation expressed in terms of the acceleration due to gravity, and $D$=distance of travel of the center of mass of the spring-supported mass, it is evident that $fn$ is inversely proportional to the square root of the distance the mass moves. And, since by the present invention the travel-distance of the total mass is reduced to one-half that required if the mass were in one integral piece or part, the natural frequency of the system according to the invention is raised by a factor of $(2)^{1/2}$, or 1.41, over that of a system using a single mass equal in weight to that of the two mass members 50 and 51. A high natural frequency is desirable so the output of the accelerometer can be essentially flat (accurate) in response to high frequency movements. The frequency range over which a spring-mass acceleration-sensor is accurate is proportional to the natural frequency of the spring-mass system of the system.

The output signal of the instrument is preferably provided by electrical signal means arranged to be operated by the two mass members 50, 51. Such electrical signal means may comprise any suitable system employing relatively movable parts which are connected to the mass members and which coact to produce an electrical change or variation that is a function of the change in angular displacement of the mass members with respect to one another. Such an electrical signal system may utilize variation in resistance, inductance, capacitance, or a combination thereof to produce the electrical signal. For purposes of illustration, there is depicted in the drawings a variable resistance device operated by the mass members as the latter partake of relative movement, the variable resistance device being connected to external electrical indicating or other signal-utilizing means. The exemplary variable resistance means comprises a resistance element 65 and a wiper or contact 66. The element 65 as shown is of the wire-wound type, and the contact 66 is of bifurcated construction as indicated in FIG. 4.

The resistance wire of element 65 (FIGS. 3 and 4) is, as an example, only depicted as being wound on an arcuately curved mandrel 67 of circular cross section, and the ends of the mandrel are mounted on posts 70 projecting from an element-supporting bracket 71. As best shown in FIG. 4, the resistance element 65 is supported and disposed in a plane parallel to the upper face of the bracket 71 and spaced therefrom, so as to allow the arms of the bifurcated contact 66 to wipe on opposite sides of the element. The bracket 71 is constructed and arranged on a base plate 72 for adjustment toward or away from the axis A, and to that end, the under side of the bracket 71 is provided with a rib 73 (see FIG. 4) which is slidably received within a complementary groove 74 in the base plate 72, and the bracket is secured to plate 72 in adjusted position by screws 75—75. The rib 73 and groove 74 extend away from the axis A, and sliding movement of the bracket 71 with respect to the base plate 72 is thus restricted to radial movement. The screws 75 that serve to secure the bracket to the base plate pass through respective ones of elongate holes 76 in the bracket as indicated in FIG. 3, which permits of the described adjustment.

The base plate 72 is secured on the upper side or face of the mass member 51 and is adjustable with respect thereto along an arcuate path concentric with the axis A. To that end the base plate 72 is provided with open-end slots 81 at its opposite ends, through which pass respective screws, 80, 80; the said screws being threaded into tapped holes in the mass member 51. By loosening the screws 80, the base plate 72 and resistance element 65 may be shifted one way or the other along an arcuate path for the purpose of adjusting the output signal of the instrument to a median value (sensitive axis horizontal), or other desired value when the input or acceleration includes all or part of that due to gravity.

It will be understood that the instrument may be arranged to give indication equally for equal accelerations in one direction (negative) and in the opposite (positive) direction along the sensitive axis, but also the arrangement may be varied to provide for different ranges of accelerations in the two directions. For examples, when the contact 66 is at the center of element 65 with the instrument static, equal and opposite ranges of accelerations are accommodated, such as from 0 to 5 $g$ in one direction and from 0 to 5 $g$ in the opposite direction. With the contact at a point one-fourth the way from an end of element 63 with the instrument static, the ranges are changed to 0 to 2.5 $g$ in one direction and 0 to 7.5 $g$ in the other direction. As herein described, the equal-range setting of the element is assumed. The total range of the instrument is dependent upon the design, as is evident, and the relative proportions and constants of the movable elements may be selected for large, intermediate or very small ranges according to the use to which the instrument is to be applied.

The wiper or contact 66 is mounted on a surface 53 of the upper mass member 50 and extends away therefrom toward element 65. The contact 66 comprises a pair of strips of metal which are laminated for a portion of their length and separate or part and form two parallel fingers 82 (FIG. 3) that contact the resistance element 65 on opposite sides or areas thereof. The outer extremities of the fingers 82 are provided with suitable contact means of limited contact area, such as inwardly facing ridges 83 extending radially from the axis A, the crests of which ridges press against the wire of the resistance element and make electrical contact therewith. As shown in FIGS. 1 and 2, the inner end of the contact 66 is brazed or otherwise secured to one limb of an angle bracket 84, which bracket is attached by screws 85 to one of the flat surfaces 53 of mass member 50.

Electrical connection to the variable resistor is by wires 86 and 87 (FIG. 2), which are connected to the ends of the resistance element 65, and by another wire (not shown) which is connected to the contact 66. The wires 86 and 87 are connected to respective ones of insulated posts 88 and 89, and these are connected, in turn, to insulated wires 90, one of which can be seen in FIG. 1. Wires 90, together with the wire connected to contact 66, are connected to terminal wires 91 in the connector or fitting 40, and when the companion fitting is joined to the connector fitting 40, the variable resistor (herein a potentiometer) is connected into an external electrical circuit (not shown) with which it is associated.

The swinging or pivotal movement of mass members 50, 51, responsive to acceleration of the instrument along axis S—S, is damped by damping means comprising a dashpot cylinder 91 and a piston 92 (FIGS. 5 and 6) which are suitably connected to respective ones of the mass members 51 and 50. The void space in the housing is completely filled with a damping fluid such as silicone oil of low viscosity (1 to 5 centistokes, for example) and the dashpot cylinder 91 and piston 92 coact with the damping fluid in a unique manner to provide damping which is substantially independent of viscosity of the fluid.

The cylinder 91 is preferably arcuately curved, as shown in FIG. 6, and is closed at one end as by a plug 93, the other end of the cylinder being open. As shown in FIG. 5, the closed end of the cylinder is secured by a screw 94 to a Z-bracket 95 which is attached, in turn, by a screw 96 to the mass member 51. As indicated, small corner portions of mass members 50 and 51 are removed to provide clearance at 50c and 51c for the cylinder 91. The piston 92 is slidably disposed within cylinder 91, and is itself curved to match the curvature of the cylinder with a very small clearance. The piston preferably and conveniently is formed by casting the piston within the cylinder, of a suitable material such as a thermosetting synthetic resin. The material is selected to have a very slight shrinkage during curing or setting, whereby the necessary slight annular clearance is provided. The piston may be cast with its curved piston rod 98 in place, and in any event is preferably maintained in place on the piston rod by nuts 97. At the other end of the piston rod 98 is a ball 99, which is seated within a socket 100 formed in a bracket member 101. The bracket member 101 is mounted on the side of the lower face of mass member 50 and is secured thereto by a screw 102. Preferably, although not necessarily, the ball 99 is pinned to the bracket member 101 by a pin 105 which extends diametrically through the ball and projects from opposite sides thereof, the projecting ends of the pin being slidable within complementary slots 106 in the bracket member 101. In some instances the piston rod may be merely pin-connected to bracket member 101, omitting the ball. Thus the piston is maintained in proper orientation in cylinder 91.

A bore 110 is formed in the picton 92; and clamped to the bottom face of the piston, as depicted in FIG. 6, is a thin circular plate 111 having an orifice 112 (FIG.7) of small diameter therein which orifice is centered with respect to the bore 110. Orifice 112 is, as indicated, of small diameter relative to that of bore 110. The plate 111 is beveled on both sides around the periphery of orifice 112, to form a sharp-edged orifice through which the damping fluid is forced as the piston is moved longitudinally within the cylinder 91 incident to relative movement of the mass members 50, 51.

Fluid flow through a sharp-edge orifice in the Reynolds number range of 50 to 30,000, is represented by the equation:

$$Q = KA \ (2gh)^{1/2} \qquad (II)$$

where K is a proportionality constant, Q is the rate of flow, A is the orifice area, g is the acceleration of gravity, and $h$ is the pressure drop across the orifice in terms of head. The above equation is independent of viscosity, and therefore the damping system of the present invention is relatively unaffected by viscosity of the damping fluid within the above stated range of Reynolds number, even though the viscosity of the fluid may change by a ratio of 9:1 within the temperature range over which the instrument may be used. In conventional damping systems where the orifice is not a sharp-edged double-beveled orifice in a thin plate, but instead is in the nature of a cylindrical bore of more or less length, the damping effect is largely a function of viscosity of the damping fluid, and therefore damping is therein virtually proportional to viscosity. In the present invention, damping is a function of inertia, that is, of the resistance of the fluid to acceleration through the sharp-edge orifice.

Reynolds number is defined by the equation:

$$R = VDd/u \qquad (III)$$

wherein V is velocity, D is orifice diameter, $d$ is fluid density and $u$ is fluid viscosity, all based upon a consistent system of measures of time, mass and distance. The Reynolds number for an exemplary instrument according to the present invention was determined for the condition which provides the desired damping, and was found to vary sinusoidally between 9000 and 0 for a liquid having a viscosity of 5 centistokes and for full range sinusoidal input. Inasmuch as the greater part of the operation of the instrument is under conditions providing a Reynolds number in excess of 50, the principles of the damping theory here utilized are found to apply essentially without distortion. One advantage of that principle is that it enables the use of low viscosity liquids instead of high viscosity liquids that are conventionally used. This has the effect of increasing the Reynolds number, as illustrated by Equation III.

The basic equation for the damping coefficient, C, is:

$$C = 2K_2 \ (kM)^{1/2} \qquad (IV)$$

wherein $K_2$ = ratio of actual damping to critical damping, and $k$ is the spring constant = $WG/D$, and wherein $M = W/g$, $W$ = weight of mass involved, G is the maximum acceleration to be accommodated in terms of acceleration due to gravity $(g)$, $D$ = the distance the mass center (center of gravity of the mass) moves when the instrument is subjected to the acceleration G, and $g$ = the acceleration due to gravity. Using the factors above, Equation IV may be expressed as:

$$C = 2K_2 W \ (G/Dg)^{1/2} \qquad (V)$$

The area of the orifice 112 is inversely proportional to the damping coefficient. This can be shown by the following considerations: the damping coefficient, C, is defined as the force required to move the center of gravity of the mass M at velocity V; that is, $C = K_3/V$. The rate of flow Q through the sharp-edge orifice is directly proportional to V, that is, $Q = K_4 V$. Hence $C = K_3 K_4 / Q$, by substitution, and $C = K_5/Q$ where $K_5 = K_3 K_4$. From Equation II it is seen that Q is directly proportional to orifice area A, or $Q = K_6 A$. Hence $A = Q/K_6 = K_5/K_6 C$, which may be written: $A = K_7/C$, showing that orifice area A is inversely proportional to the damping coefficient. In this analysis K is a constant in each instance. The value of $K_3$ includes the ratio of the radius of movement of the piston (or cylinder) to the radius of rotation of the center of gravity of a mass, as is evident from elementary mechanics. Thus it is to be noted that the area of the orifice is in each case determined in accord with the range of accelerations to be accommodated by a particular instrument, the mass value of the masses employed, the spring constants of the springs used in the instrument, and the extent of damping desired.

Swinging movement of the mass members 50, 51 is limited by respective limit stop screws 115 and 116 (see FIG. 5), which are threaded through tapped holes in brackets 117 and 118, respectively. Bracket 117 is secured by screws 120 to base plate 16, and limit stop screw 115 is disposed so that one end thereof is engageable by a flat face 53 of mass member 51 when the latter has swung to the end of its travel. In like manner, bracket 118 is secured by screws 121 to upper plate 30, and limit stop screw 116 is disposed so that one end thereof is engageable by a flat face 53 of mass member 50 when the latter has swung to the end of its travel. The openings at screws 120, 121, may be sealed by being daubed with resin or in other obvious ways. Lock means such as lock nuts (not shown) may be employed to lock screws 115 and 116 against undesired change.

The operation of the instrument is made evident by the foregoing description. In the illustrative example for equal + and − ranges, when the instrument is at rest the mass members 50 and 51 are positioned in their neutral positions as indicated in FIG. 8, by natural action of the crossed leaf springs 60, 61 suspending the masses. Acceleration of the instrument toward the right causes the two mass members 50 and 51 to swing in opposite directions of rotation against the resisting action of the leaf springs 60, 61, rotation of member 51 being clockwise, and that of member 50 being counter-clockwise. Thus the contact 66 and element 65 are shifted, each relative to the other, by an angular distance equal to the sum of their angular travels.

FIGURE 10 illustrates the inherent insensitivity of the instrument to cross-axis acceleration. In this case, the instrument is shown in the condition assumed when it is exposed to a cross-axis acceleration (in the upward direction in FIG. 10) at the same time that it is responding to a horizontal or sensitive-axis acceleration of the same magnitude as was used in the case of FIG. 9. With both mass members off-set equal distances to the left of their neutral positions (as indicated in FIG. 9) the effect of cross acceleration in the direction of arrow C (FIG. 10) is to cause both mass members to swing through equal distances in the same direction (counterclockwise), as indicated in FIG. 10. The net effect is that the contact 66 remains at the same spot on the resistance element, and the electrical output signal is entirely unaffected by the cross-axis acceleration. It will be understood that the device provides an output signal by changing the effective electrical resistance exhibited between either (or both) of the leads 86 and 87 and the lead connected to contact 66; whereby the signal is a change in an electrical quantity such as potential or current. The source of potential (or current) and other circuit element to which the several leads are connected are not shown since they may be of a variety of forms and are well known in the art and per se form no part of the present invention. Also it will be understood that the shapes, material-density and mass-distribution characteristics of the inertial masses 50 and 51, and the appurtenant movable components such as the cylinder and piston and the contact and resistance element, are preferably so selected that the appurtenant movable components are substantially in dynamic balance or that existing imbalance is of no consequence in the operation of the device. Thus the appurtenant movable components may be of relatively light-weight materials, and the inertial masses of material having a high specific gravity or density, such as that marketed under the trade name Mallory 1000.

From the preceding description it is evident that an exemplary acceleration-sensing instrument according to the invention has a sensitive axis (that is, an axis of sensitivity) that extends or is disposed transversely of second and third other axes all of which axes intersect at a point within the instrument and are mutually perpendicular each to the other; the parts of the instrument being so constructed and arranged that acceleration of the instrument in the direction of the sensitive axis results in opposite rotational movements of first and second inertial mass members about the second axis and so that acceleration of the instrument in the direction of the third axis results in like rotational movements (movements in the same direction) about the second axis, whereby relative movement of either of the mass members with respect to the other is indicative of acceleration in the direction of the sensitive axis and whereby acceleration in the direction of either of the second and third axis is of no consequence in the indication provided by the instrument. The sensitive axis is in the direction right to left and vice versa in FIG. 2 and passes through the line defined by the intersection of the planes of the sets of leaf springs (axis A) and is perpendicular thereto, the second axis being axis A. The third axis is defined as a line intersecting the sensitive axis and axis A at substantially the center of the instrument and perpendicular to the other two axes, and extending generally in a top to bottom direction and vice versa in FIG. 2.

While there is shown and described in detail what is believed to be the preferred form of instrument according to the invention, it will be understood by those skilled in the art that various changes may be made in the shape and arrangement of the several parts without departing from the spirit and scope of the invention as defined in the appended claims:

We claim:
1. An acceleration-sensing instrument comprising:
first means, including rigid support means;
second means, including first and second inertial masses;
third means, including for each of said inertial masses a respective set of elongate leaf springs each spring having one end thereoef affixed to said support means and the other end thereof affixed to the respective interial mass to support that mass for limited rocking movement relative to said support means, and a first spring of each of said sets being disposed substantially in a plane intersecting along a line another plane in which is substantially disposed a second spring of each of said sets whereby the line of intersection of the planes becomes an axis about which the said masses are constrained to rotate in rocking movements relative to said support means and whereby each of said masses is supported for respective limited rotational movement relative to said support means about said axis and for movement of either mass relative to the other, and whereby in response to acceleration of said support means in a selected direction transverse to said axis the masses rotate in opposite directions and the extent of relative rotation of the masses is a measure of the magnitude of the acceleration of said support means in said direction;
fourth means, including dashpot damping means and damping fluid therefor, said damping means including a cylinder mounted on one of said masses for movement therewith and a cooperating piston mounted on the other of said masses for movement therewith, and including a small sharp-edge circular orifice through which damping fluid is forcibly accelerated by relative movement of said piston and cylinder incident to movement of either of said masses relative to the other, to damp such relative movement, whereby the damping of movement of either of said masses relative to the other is substantially independent of the viscosity of said damping fluid;
and fifth means, including housing means in which said first, second, third and fourth means are housed.
2. An acceleration-sensitive instrument comprising:
first means, comprising housing means and rigid support means secured in the housing means for movement therewith;

second means, comprising first and second intertial mass members contained in said housing means;

third means, comprising for each of said mass members respective sets of crossed leaf springs each set of which supports a respective one of the mass members and each spring of either set secured at one end thereof to said support means and secured at the other end thereof to the respective one of said mass members and the springs of any set including at least one spring disposed in crossed relationship with another spring of that set whereby the respective mass member supported thereby is constrained to to-and-fro pivotal movement about an axis defined by the crossing of the springs supporting that mass member;

fourth means, comprising damping means including damping fluid and first and second relatively movable components each rigidly connected to a respective one of said mass members for movement therewith and effective to confine a body of damping fluid and said components including means defining a small sharp-edge circular orifice and said components being constructed and arranged to accelerate damping fluid through the orifice incident to movement of either component relative to the other to thereby damp movement of either of said mass members relative to the other mass member;

and fifth means, comprising first and second signal means each secured to a respective one of said mass members for movement therewith and effective upon relative movement or either with respect to the other to indicate relative movement of the respective mass members either with respect to the other;

whereby indication by said signal means of relative movement of either of said mass members with respect to other, indicates acceleration of said fixed support means in one direction only of three mutually perpendicular directions.

References Cited by the Examiner

UNITED STATES PATENTS

| 666,237 | 1/01 | Riotte | 73—522 |
|---|---|---|---|
| 1,959,544 | 5/34 | Paulin | 73—430 |
| 2,054,466 | 9/36 | Peo | 188—89 |
| 2,797,911 | 7/57 | Montgomery | 73—516 |
| 2,959,057 | 11/60 | Winker | 73—516 |

FOREIGN PATENTS

| 753,409 | 8/33 | France. |
|---|---|---|
| 1,060,073 | 11/53 | France. |
| 783,104 | 9/57 | Great Britain. |
| 159,078 | 6/57 | Sweden. |

RICHARD C. QUEISSER, *Primary Examiner.*

SAMUEL LEVINE, ROBERT L. EVANS, JOSEPH P. STRIZAK, JAMES J. GILL, *Examiners.*